(12) United States Patent
Nair

(10) Patent No.: US 12,454,599 B2
(45) Date of Patent: *Oct. 28, 2025

(54) FUNCTIONALIZED POLY(ARYL ETHER SULFONES) COPOLYMERS AND POLYMER ADDUCTS OBTAINED THEREFROM

(71) Applicant: SYENSQO SPECIALTY POLYMERS USA, LLC, Alpharetta, GA (US)

(72) Inventor: Kamlesh Nair, Alpharetta, GA (US)

(73) Assignee: SYENSQO SPECIALTY POLYMERS USA, LLC, Alpharetta, GA (US)

(*) Notice: Subject to any disclaimer, the term of this patent is extended or adjusted under 35 U.S.C. 154(b) by 657 days.

This patent is subject to a terminal disclaimer.

(21) Appl. No.: 17/640,389

(22) PCT Filed: Sep. 9, 2020

(86) PCT No.: PCT/EP2020/075237
§ 371 (c)(1),
(2) Date: Mar. 4, 2022

(87) PCT Pub. No.: WO2021/048229
PCT Pub. Date: Mar. 18, 2021

(65) Prior Publication Data
US 2022/0348720 A1    Nov. 3, 2022

Related U.S. Application Data

(60) Provisional application No. 62/897,450, filed on Sep. 9, 2019.

(30) Foreign Application Priority Data

Nov. 13, 2019 (EP) .................................... 19208913

(51) Int. Cl.
*C08G 75/23* (2006.01)
*C08J 3/24* (2006.01)

(52) U.S. Cl.
CPC .............. *C08G 75/23* (2013.01); *C08J 3/242* (2013.01); *C08G 2150/00* (2013.01)

(58) Field of Classification Search
CPC ........ C08J 3/242; C08J 3/247; C08J 2371/08; C08G 65/4068; C08G 65/093; C08G 65/48; C08G 75/23; C08G 2650/40; C08G 2150/00; C08K 3/40; C08K 5/5419; C08K 7/14

See application file for complete search history.

(56) References Cited

U.S. PATENT DOCUMENTS

| 4,883,855 A | 11/1989 | Stockinger |
| 2005/0228149 A1 | 10/2005 | Trivedi et al. |
| 2010/0183946 A1 | 7/2010 | Choi et al. |
| 2019/0263982 A1* | 8/2019 | Jeol .................... C08G 65/4068 |

FOREIGN PATENT DOCUMENTS

| CN | 107722260 A | 2/2018 |
| KR | 20170075105 A | 7/2017 |
| WO | 2005095491 A1 | 10/2005 |
| WO | 2008076637 A1 | 6/2008 |
| WO | WO 2020/187684 A1 | 9/2020 |

OTHER PUBLICATIONS

Han J. et al., "Effect of Micromorphology on Alkaline Polymer Electrolyte Stability", ACS Appl. Mater. Interfaces, 2019, vol. 11, p. 469-477—American Chemical Society—published on Dec. 10, 2018, doi:10.1021/acsami.8b09481.
U.S. Appl. No. 17/437,457, filed Sep. 9, 2021, Kamlesh Nair.
Ni J. et al., "Crosslinked hybrid membranes based on sulfonated poly(ether ether ketone)/γ-methacryloxypropyltrimethoxysilane/phosphotungstic acid by an in situ sol-gel process for direct methanolfuelcells", Journal of Materials Chemistry, 2010, vol. 20, p. 6352-6358—The Royal Society of Chemistry.
Huang X. et al., "Synthesis and properties of side-chain-type ion exchange membrane PEEK-g-StSO3Na for bipolar membranes", Applied Surface Science, 2012, vol. 258, p. 2312-2318—Elsevier B.V.
Ding F.C. et al., "Fabrication and properties of cross-linked sulfonated fluorene-containing poly(arylene ether ketone) for proton exchange membrane", Journal of Power Sources, 2007, vol. 170, p. 20-27—Elsevier B.V.
Percec V. et al., "Functional polymers and sequential copolymers by phase transfer catalysis, 3.+ Syntheses and characterization of aromatic poly(ether sulfone)s and poly(oxy-2,6-dimethyl-1,4-phenylene) containing pendant vinyl groups", Makromol. Chem and Physics, 1984, vol. 185, No. 11, pp. 2319-2336, DOI: 10.1002/macp.1984.021851110.
Li Y. et al., "Epoxy/polysiloxane intimate intermixing networks driven by intrinsic motive force to achieve ultralow-temperature damping properties", Journal of Materials Chemistry A, 2017, vol. 5, No. 33, pp. 17549-17562, DOI: 10.1039/C7TA04894G—The Royal Society of Chemistry.

* cited by examiner

*Primary Examiner* — Shane Fang

(57) ABSTRACT

The present invention relates to copolymers comprising moieties able to undergo a crosslinking reaction under certain stimuli, thereby forming polymer adducts having improved or additional properties, such as resistance to solvents, increased thermal performance and increased adhesion to surfaces.

17 Claims, No Drawings

FUNCTIONALIZED POLY(ARYL ETHER SULFONES) COPOLYMERS AND POLYMER ADDUCTS OBTAINED THEREFROM

RELATED APPLICATIONS

This application is a U.S. national stage entry under 35 U.S.C. § 371 of International Application No. PCT/EP2020/075237 filed Sep. 9, 2020 which claims priority to U.S. provisional application U.S. No. 62/897,450 filed on Sep. 9, 2019 and to European patent application EP No. 19208913.4 filed on Nov. 13, 2019, the whole content of these applications being incorporated herein by reference for all purposes.

TECHNICAL FIELD

The present invention relates to copolymers comprising moieties able to undergo a crosslinking reaction under certain stimuli, thereby forming polymer adducts having improved or additional properties, such as resistance to solvents, increased thermal performance and increased adhesion to surfaces.

BACKGROUND ART

Certain polymers can change their properties under specific conditions, for example humidity, pH, UV light or heat. As an example, molecular architecture changes in water permeability, or under acid/basic pH conditions, can be exploited to design specific polymers or to create in situ bonding or reaction. One example of such a change in the molecular architecture resides in polymers comprising crosslinkable moieties which can undergo crosslinking under specific conditions or treatment.

Polyolefins functionalized with silanol side chains is one example of such polymers comprising crosslinkable moieties. The thermodimensional stability of the polyolefins can be significantly improved through side-chain crosslinking. Such crosslinkable polyolefins can be prepared by melt extruding the polyolefin with a free-radical initiator and a silanol crosslinking agent or exposed to e-beams. The polyolefin backbone undergoes proton abstraction and reacts with the silanol crosslinking agent forming a silanol-functionalized polyolefin which then can be crosslinked in the presence of heat and moisture. The melt extrusion preparation process does not however apply to all type of polymers, such as aromatic poly(aryl ether sulfone) polymers (PAES). Indeed, melt extruding the polymers in the presence of an initiator and a silanol crosslinking agent would actually not result in such side-chain functionalizations since the backbone of most of the polysulfones such as polyphenylsulfones (PPSU) and polyethersulfones (PES) lack protons which can be abstracted and result in subsequent functionalization.

The present invention offers another approach to prepare crosslinkable sulfone polymers.

The article of NI JING et al. (J. Mater. Chem, 2010, 20, 6352-6358) relates to crosslinked hybrid membranes based on sulfonated poly(ether ether ketone) (PEEK). This article describes the preparation of a copolymer comprising PEEK recurring units, some of them being sulfonated, starting from diallyl bisphenol A (daBPA), 4,4-Difluorobenzophenone (DFB) and 5,5-Carbonyl-bis(2-fluoro benzenesulfonate) (SDFR) and the preparation of membranes starting from this copolymer, as well as phosphotungstic acid (PWA) and 3-methacryloxypropyltrimethoxysilane (KH570).

The article of XUEHONG HUANG et al. (Applied Surface Science 258, 2012, 2312-2318) relates to the synthesis of side-chain-type ion exchange membrane. This article describes the preparation of a copolymer starting from DFB, bisphenol A and diallyl bisphenol A, and the grafting reaction of this copolymer is the presence of sodium sulfonic styrene and KH570.

The article of DING F C et al. (Journal of Power Sources 170, 2007, 20-27) relates to the fabrication of cross-linked sulfonated fluorene-containing PEEK for proton exchange membrane, using diallyl biphenol (daBP).

These articles describe the preparation of functionalized PEEK polymers in order to prepare membranes. However PEEK polymers are semi-crystalline polymers and lack the required elongation and flexibility to prepare membranes with a good set of mechanical properties.

WO2005095491 (Gharda) and US20050228149 (Solvay) relate to processes for preparing block copolymers in a family of polysulfones, i.e. polymers containing sulfone linkages, particularly polysulfones (PSU), polyether Sulfones (PES) and polyphenylene sulfones (PPSU), and to block copolymers prepared therefrom. These documents do not describe sulfones copolymers with silanol thioether side-chain functionalized recurring units.

The article of YAN L I et al. (J. Mater. Chem. A, 2017, 5, 17549-17562) describes the synthesis of networks based on an epoxy/polysiloxane monomer (SH-EP) in a one-pot synthesis. KR20170075105A (Samyang Corp) relates to a bisphenol-based epoxy compound having an alkoxysilylalkyl-S-alkyl group and to a method for manufacturing the same, as well as the cured product. Neither of these documents describe sulfone copolymers, let alone the side-chain functionalized copolymers of the present invention. These systems are based on small molecules to form a crosslinkable structures. These small molecules have two distinct functional groups one epoxy and one silanol, with the epoxy groups requiring a compatible crosslinking agent such as a diamine or dialcohol. The crosslinking of such structures result in brittle structures because they are based on small molecule precursors. Furthermore, the thermal resistance of such systems is expected to be low.

One object of the present invention is an adduct obtained from the crosslinking of a copolymer based on amorphous sulfone recurring units, such adduct being, notably, well-suited to prepare membranes with the required set of mechanical properties (e.g. elongation and flexural strengths).

SUMMARY OF INVENTION

An aspect of the present disclosure is directed to a polymer adduct obtained by crosslinking a copolymer (P1) comprising:

recurring units ($R_{P1}$) of formula (M):

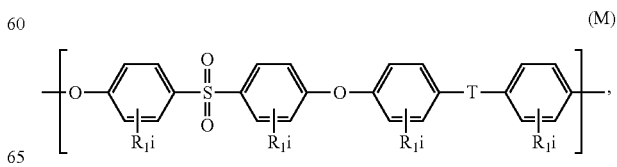

recurring units (R*$_{P1}$) of formula (N):

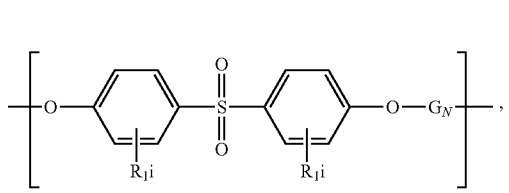

wherein

G$_N$ is selected from the group consisting of at least one of the following formulas:

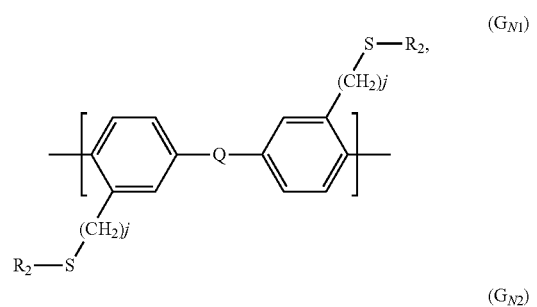

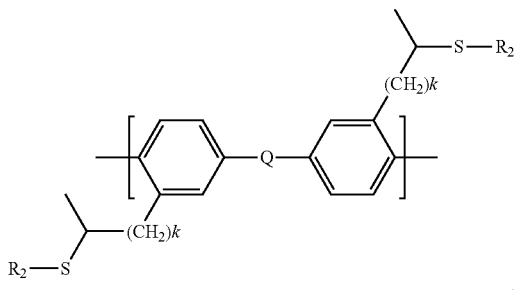

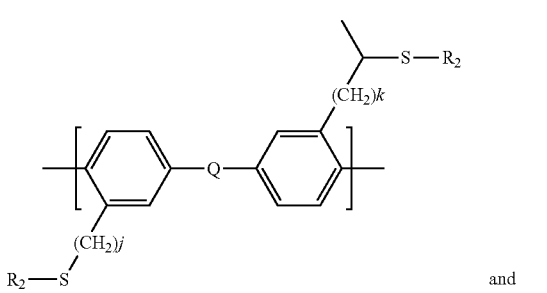

and

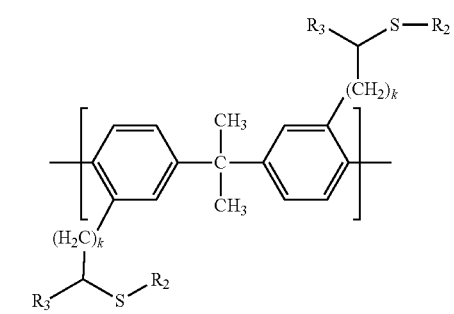

each R$_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

R$_2$ is —(CH$_2$)r-Si(OCH$_3$)$_3$, with r being selected from 1 to 5;

R$_3$ is an alkyl group, an aryl group or an halogen group;

each k is independently selected from 1 to 4;

each j is independently selected from 3 to 7; and

T and Q are independently selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$OOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof.

The present invention also relates to the use of the copolymer (P1) described herein in the preparation of an adduct to be used as a coating, as an additive in a composite material to improve the binding between the filler (such as glass fiber or carbon fibers) and the polymeric matrix, as well as a self-crosslinkable resin to prepare composite products.

DISCLOSURE OF THE INVENTION

The copolymer (P1) described herein can be effectively crosslinked to form a polymer adduct via reaction between the functionalized polymer side-chains.

The formation of these adducts represents a convenient way of obtaining high molecular weight polymeric structures, i.e. adducts from polymers of lower molecular weight, in the melt or in solution phase. It also represents a convenient way to obtain high molecular weight polymeric structures without rearrangement and randomization of the polymer repeat units, because the formation of adducts occurs under mild conditions. It also represents a useful way to strengthen the surface of an article by crosslinking in situ the composition comprising the copolymer (P1).

Furthermore this chemistry can also be used to increase the bonding between polymers and inorganic fillers (e.g. glass fibers), for example by reacting the copolymer (P1) with the sizing agent located at the surface of sized fibers. Increasing the interaction between the resin and the filler improves the mechanical performance of the resultant product combination.

The present invention is based on the crosslinking of copolymer (P1) that-is-to-say copolymer comprising crosslinkable moieties, e.g. functionalized with silanol thioether side chains. During the crosslinking, the silanol functional groups can notably self-condense and form a —Si—O—Si— bond with the elimination of an alcohol molecule. As a result, the polymer chains are crosslinked together by strong covalent bonds which have interesting properties, such as resistance to solvents and thermal performance.

The silanol thioether side chains present several technical advantages. The silanol groups can be self-crosslinked using mild conditions in the presence of moisture and acid catalyst to form for example crosslinked coatings, composites and laminated among other structures. No additional crosslinking agent is needed to form the network structures. Because the adduct is based on a copolymer, that-is-to-say an entity having a certain molecular weight in comparison to a monomer or a small molecule, the adduct obtained from the crosslinking of such copolymer retains the thermo-mechanical properties such as impact strength resulting from the polymer matrix. Silanol groups also present the advantage that they bind with inorganic fillers such as carbon fibers and glass fibers and improve the mechanical properties of the composite structure due to increased bonding between the interfaces of the filler and the polymer structures.

The copolymers of the present invention can also be used as compatibilizers for polymer blends, notably incompatible polymer blends. Due to the molecular weight of the polymers and the resultant high thermal stability, the copolymers described herein can be used to compatibilize thermally resistant polymer blends by creating chemical interactions between the silanol groups of the copolymer of the present invention with the chain ends of the other polymers structures to be blended.

"Crosslinkable" means that the polymer is not cured or crosslinked yet, and that the polymer comprises moieties which will cause or promote substantial crosslinking upon subjection or exposure to such treatment (e.g. exposure to heat, humidity and/or water).

"Crosslinked" means that the copolymer was subjected or exposed to a treatment which induced crosslinking of its crosslinkable moieties.

In the present application:
any description, even though described in relation to a specific embodiment, is applicable to and interchangeable with other embodiments of the present disclosure;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
any recitation herein of numerical ranges by endpoints includes all numbers subsumed within the recited ranges as well as the endpoints of the range and equivalents.

The present invention relates to a polymer adduct obtained by crosslinking a side-chain functionalized copolymer (P1). This copolymer (P1) comprises at least two types of recurring units, namely recurring units ($R_{P1}$) of formula (M) and recurring units ($R^*_{P1}$) of formula (N), described below. The recurring units ($R^*_{P1}$) are functionalized with a thioether functional group which is —$(CH_2)j$-S—$R_2$ wherein j varies between 1 and 4 and $R_2$ is —$(CH_2)r$-Si$(OCH_3)_3$, with r being selected from 1 to 5, preferably r being 1, 2 or 3.

The functional groups of copolymer (P1) are internal functionalizations, within the copolymer backbone. The internal functionalizations result from a step-growth polymerization, in the presence of an allyl-substituted monomer, which advantageously makes the system versatile as the content of functionality can be adjusted by varying the content of allyl-substituted monomer in the reaction mixture. The allyl-substituted monomer comprises two pendant allyl group side chains which according to the present invention each comprises from 3 to 7 carbon atoms.

The copolymer (P1 of the present invention comprises:
recurring units ($R_{P1}$) of formula (M):

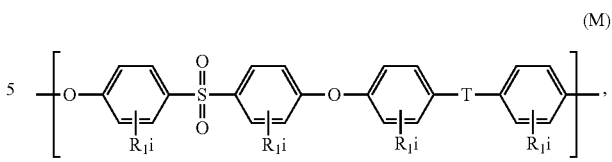

recurring units ($R^*_{P1}$) of formula (N):

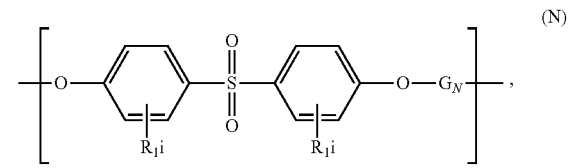

wherein
$G_N$ is selected from the group consisting of at least one of the following formulas:

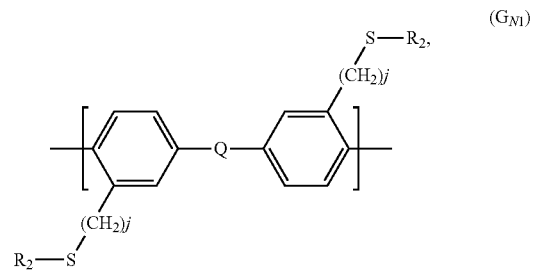

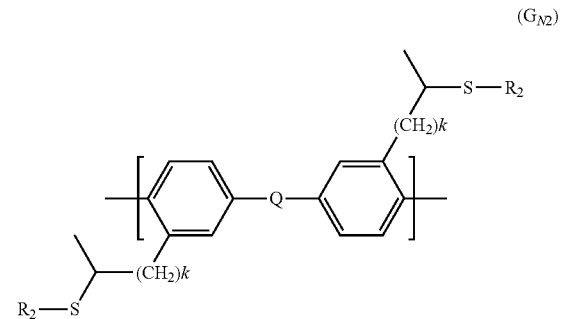

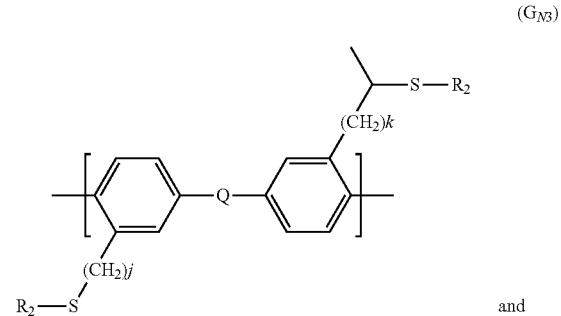

and

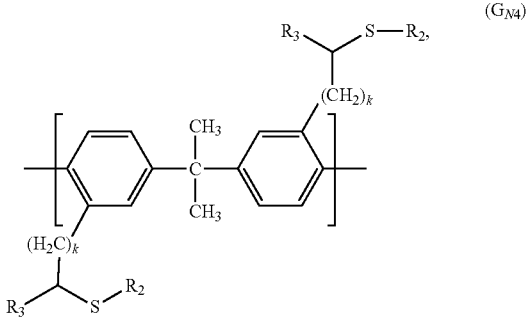

(G$_{N4}$)

each R$_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each i is independently selected from 0 to 4;
R$_2$ is —(CH$_2$)r-Si(OCH$_3$)$_3$, with r being selected from 1 to 5;
R$_3$ is an alkyl group, an aryl group or an halogen group;
each k is independently selected from 1 to 4;
each j is independently selected from 3 to 7; and
T and Q are independently selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$OOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof.

The copolymer (P1) of the present invention is in the form of a racemate product. Due to the presence of the base and high temperature during polymerization, the allyl-substituted monomer usually racemizes during polymerization in such a way that the position of the double bond may change along the side chains. This leads to the formation of molecules differing from each others by the fact that the double bond may be at the end of the side chain or one carbon before the end of the side chain. The amount of racemization depends on the reaction time and temperature.

In some embodiments, the copolymer (P1) does not comprise epoxy groups or comprise less than 2 mol. %, preferably less than 1 mol. %, een more preferably less than 0.5 mol. % of epoxy groups, based on the total number of moles in the copolymer (P1).

In some embodiments, the copolymer (P1) is such that it comprises at least 50 mol. % of recurring units (R$_{P1}$) of formula (M), based on the total number of moles in the copolymer (P1), for example at least 55 mol. % or at least 60 mol. %.

In some embodiments, the copolymer (P1) comprises collectively at least 50 mol. % of recurring units (R$_{P1}$) and (R*$_{P1}$), based on the total number of moles in the copolymer (P1). The copolymer (P1) may for example comprise collectively at least 60 mol. %, at least 70 mol. %, at least 80 mol. %, at least 90 mol. %, at least 95 mol. %, at least 99 mol. % of recurring units (R$_{P1}$) and (R*$_{P1}$), based on the total number of moles in the copolymer (P1). The copolymer (P1) may preferably consists essentially in recurring units (R$_{P1}$) and (R*$_{P1}$).

In some embodiments, the copolymer (P1) is such that it comprises:
recurring units (R*$_{P1}$) wherein the group G$_N$ is according to formula (G$_{N1}$), preferably at least 25 mol. % of the recurring units (R*$_{P1}$) are such that the group G$_N$ is according to formula (G$_{N1}$), more preferably at least 30 mol. %, even more preferably 35 mol. %;
recurring units (R*$_{P1}$) wherein the group G$_N$ is according to formulas (G$_{N1}$) and (G$_{N3}$), preferably at least 35 mol. % of the recurring units (R*$_{P1}$) are such that the group G$_N$ is according to formula (G$_{N1}$) and (G$_{N3}$), more preferably at least 40 mol. %, even more preferably 45 mol. %; or
at least recurring units (R*$_{P1}$) wherein the group G$_N$ is according to formulas (G$_{N1}$), (G$_{N2}$) and (G$_{N3}$), preferably at least 50 mol. % of the recurring units (R*$_{P1}$) are such that the group G$_N$ is according to formula (G$_{N1}$) and (G$_{N3}$), more preferably at least 60 mol. %, even more preferably 70 mol. %, 80 mol. % or 90 mol. %.

In some embodiments, the copolymer (P1) is such that T in recurring units (R$_{P1}$) is selected from the group consisting of a bond, —SO$_2$—, —C(CH$_3$)$_2$— and a mixture therefrom. The copolymer (P1) of the present invention may, for example, comprise recurring units (R$_{P1}$) in which T is —C(CH$_3$)$_2$— and recurring units (R$_{P1}$) in which T is —SO$_2$—.

T in recurring units (R$_{P1}$) is preferably —C(CH$_3$)$_2$—.

In some embodiments, the copolymer (P1) is such that Q in (G$_{N1}$), (G$_{N2}$) and/or (G$_{N3}$) of recurring units (R*$_{P1}$) is selected from the group consisting of a bond, —SO$_2$—, —C(CH$_3$)$_2$— and a mixture therefrom.

In some preferred embodiments, G$_N$ is selected from the group consisting of at least one of the following formulas:

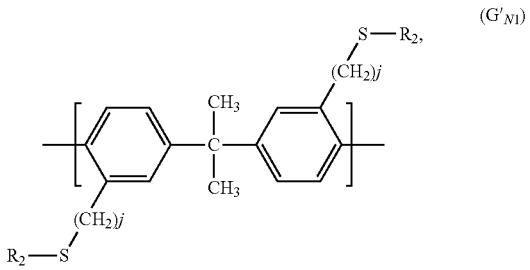

(G'$_{N1}$)

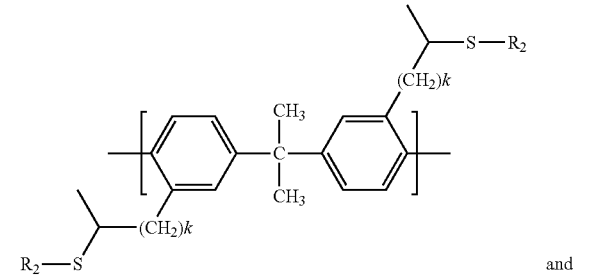

(G'$_{N2}$)

and (G'N3)

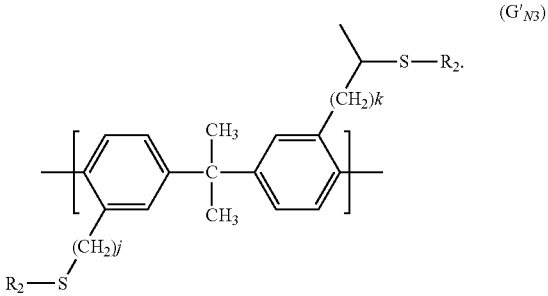

In some embodiments, the copolymer (P1) is such that each R1 is independently selected from the group consisting of a C1-C12 moiety optionally comprising one or more than one heteroatoms; sulfonic acid and sulfonate groups; phosphonic acid and phosphonate groups; amine and quaternary ammonium groups.

In some embodiments, the copolymer (P1) is such that i is zero for each R1 of recurring units ($R_{P1}$) and recurring units ($R^*_{P1}$).

In some embodiments, the copolymer (P1) is such that k is zero and j is 3 in recurring units ($R^*_{P1}$).

In some embodiments, the copolymer (P1) is such that the molar ratio of recurring units ($R_{P1}$)/recurring units ($R^*_{P1}$) varies between 0.01/100 and 100/0.01, preferably between 1/100 and 100/1, more preferably between 1/1 and 12/1, even more preferably between 4/1 and 10/1.

In some embodiments, the copolymer (P1) is such that recurring units ($R_{P1}$) are according to formula (M1):

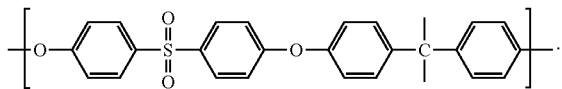
(M1)

In some embodiments, the copolymer (P1) is such that R2 in recurring units ($R^*_{P1}$) is —$(CH_2)_3$—$Si(OCH_3)_3$.

According to an embodiment, the copolymer (P1) of the present invention has a Tg ranging from 120 and 250° C., preferably from 170 and 240° C., more preferably from 180 and 230° C., as measured by differential scanning calorimetry (DSC) according to ASTM D3418.

Optional Components

The copolymers (P1) may be mixed with optional components before being crosslinked, for example with one or more solvents.

The solvents can notably be polar solvents selected form the group consisting of N-methyl-pyrrolidone (NMP), dichloromethane, dimethyl formamide (DMF), 1,3-dimethyl-2-imidazolidinone (DMI), dimethyl acetamide (DMAc) diphenylsulfone, sulfolane, dimethyl sulfoxide (DMSO) and chlorobenzene.

The copolymers (P1) may also be mixed with one or more additives.

The additives can notably be selected from the group consisting of filler (e.g. glass fibers, carbon fibers), lubricants, plasticizers, fire retardants, rheology modifiers, stabilizers and pigments.

The copolymers (P1) may also be mixed with one or more thermal adduct formers.

The thermal adduct formers can notably be selected from the group consisting of fullerenes ($C_{60}$, $C_{70}$, fullerite), bismaleimide (4,4'-bismaleimido-diphenylmethane), phenylene dimaleimides (e.g. N,N'-(1,2-phenylene)dimaleimide, N,N'-(1,3-phenylene)dimaleimide, N,N'-(1,4-phenylene)dimaleimide).

Adducts

The present invention relates to a polymer adduct obtained by crosslinking a copolymer (P1) described above. The crosslinking is a reaction is which two or more molecules combine in order to create a polymer complex network.

The crosslinking of the copolymer (P1) can be obtained by at least one of the following steps:

heating at a temperature ranging from 60° C. to 250° C., preferably from 65° C. to 200° C., exposing to acid/basic conditions, respectively to a pH<5 or a pH>9, and/or exposing to humidity with a humidity percentage of a least 30%, for example in the presence moisture, water or water-generating compounds.

Notably, the exposition to humidity can be with a humidity percentage of at least 40%, at least 50%, at least 60%, at least 70%, at least 80%, or at least 90%.

Process for Preparing Copolymer (P1)

The copolymer (P1) can be prepared by various chemical processes, notably by free radical-thermal reaction, by free radical-UV reaction, by base-catalysed reaction or by nucleophilic-catalysed reaction.

The process for preparing copolymer (P1) comprises reacting an allyl-functionalized copolymer (P0) with a compound $R_2$—SH, wherein $R_2$ is —$(CH_2)_r$-$Si(OCH_3)_3$, with r being selected from 1 to 5, preferably r being 1, 2 or 3.

The copolymer (P0), used in the process of the present invention, notably comprises recurring units ($R^*_{P0}$) with pendant allyl side-chains, which are reactive with the compound $R_2$—SH. The copolymer (P0) more precisely comprises:

recurring units ($R_{P0}$) of formula (M):

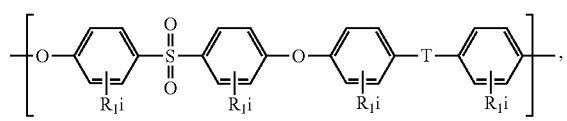
(M)

recurring units ($R^*_{P0}$) of formula (P):

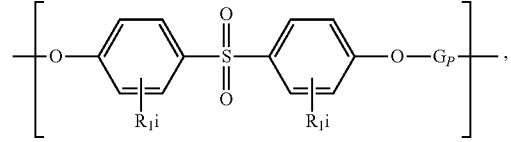
(P)

wherein $G_P$ is selected from the group consisting of at least one of the following formulas:

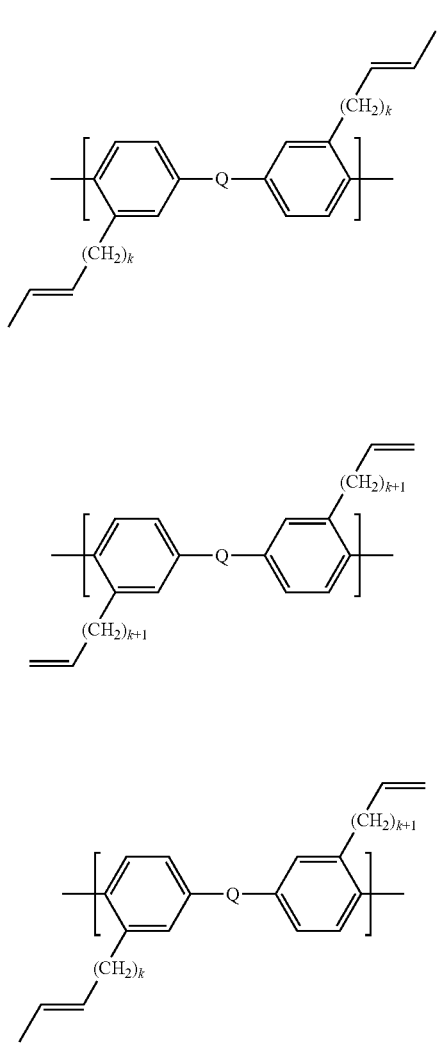

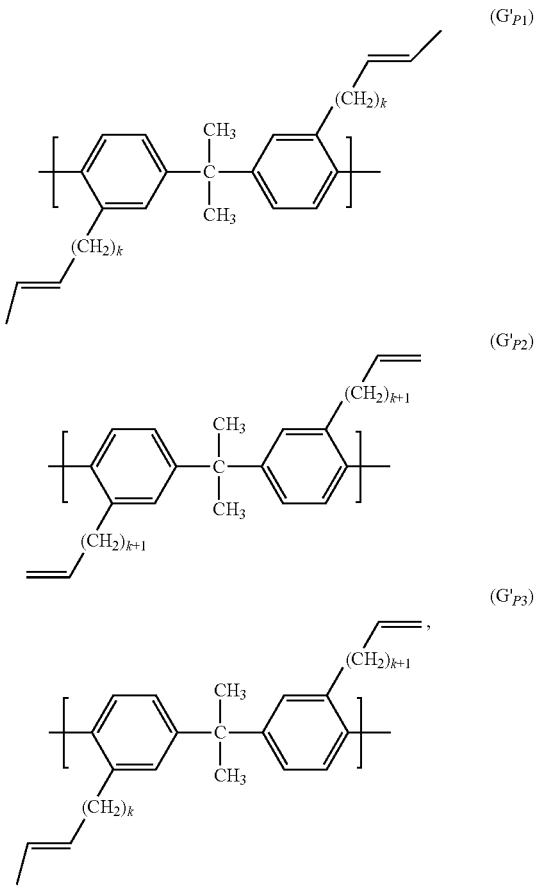

and each k is independently selected from 0 to 4.

each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

each k is independently selected from 0 to 4.

T and Q are independently selected from the group consisting of a bond, $-CH_2-$; $-O-$; $-SO_2-$; $-S-$; $-C(O)-$; $-C(CH_3)_2-$; $-C(CF_3)_2-$; $-C(=CCl_2)-$; $-C(CH_3)(CH_2CH_2COOH)-$; $-N=N-$; $-R_aC=CR_b-$, where each $R_a$ and $R_b$, independently of one another, is a hydrogen or a C1-C12-alkyl, C1-C12-alkoxy, or C6-C18-aryl group; $-(CH_2)_m-$ and $-(CF_2)_m-$ with m being an integer from 1 to 6; an aliphatic divalent group, linear or branched, of up to 6 carbon atoms; and combinations thereof.

In some embodiments, the copolymer (P0) is such that k is zero in recurring units ($R^*_{P0}$).

In some embodiments, $G_P$ is selected from the group consisting of at least one of the following formulas:

The reaction to prepare copolymer (P1) is preferably carried out in a solvent. When the reaction to prepare copolymer (P1) is carried out in a solvent, the solvent is for example a polar aprotic solvent selected from the group consisting of N-methylpyrrolidone (NMP), N-butylpyrrolidone (NBP), N-ethyl-2-pyrrolidone, N,N-dimethylformamide (DMF), 1,3-dimethyl-2-imidazolidinone (DMI), N,N dimethylacetamide (DMAC), 1,3-dimethyl-2-imidazolidinone, tetrahydrofuran (THF), dimethyl sulfoxide (DMSO), chlorobenzene, anisole and sulfolane. The solvent may also be chloroform or dichloromethane (DCM). The reaction to prepare copolymer (P1) is preferably carried out in sulfolane or NMP.

The molar ratio of compound (1)/polymer (P0) varies between varies between 0.01/100 and 100/0.01, preferably between 1/100 and 100/1, more preferably between 1/1 and 10/1.

The temperature of the reaction to prepare copolymer (P1) varies between 10° C. and 300° C., preferably between room temperature and 200° C., or more preferably between 35° C. and 100° C.

In some embodiments, the copolymer (P0) is such that T in recurring units ($R_{P0}$) is selected from the group consisting of a bond, $-SO_2-$, $-C(CH_3)_2-$ and a mixture therefrom. The copolymer (P0) may, for example, comprise recurring units ($R_{P0}$) in which T is $-C(CH_3)_2-$ and recurring units ($R_{P1}$) in which T is $-SO_2-$.

T in recurring units ($R_{P0}$) is preferably $-C(CH_3)_2-$.

In some embodiments, the copolymer (P0) is such that each $R_1$ is independently selected from the group consisting of a C1-C12 moiety optionally comprising one or more than one heteroatoms; sulfonic acid and sulfonate groups; phosphonic acid and phosphonate groups; amine and quaternary ammonium groups.

In some embodiments, the copolymer (P0) is such that i is zero for each $R_1$ of recurring units ($R_{P0}$) and recurring units ($R^*_{P0}$).

In some embodiments, the copolymer (P0) is such that j is 2 in recurring units ($R_{P0}$).

In some embodiments, the copolymer (P0) is such that the molar ratio of recurring units ($R_{P0}$)/recurring units ($R^*_{P0}$) varies between 0.01/100 and 100/0.01, preferably between 1/100 and 100/1.

In some embodiments, the copolymer (P0) is such that recurring units ($R_{P0}$) are according to formula (M1):

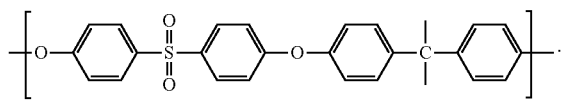

(M1)

In some embodiments, the copolymer (P0) comprises collectively at least 50 mol. % of recurring units ($R_{P0}$) and ($R^*_{P0}$), based on the total number of moles in the copolymer (P0). The copolymer (P0) may for example comprise collectively at least 60 mol. %, at least 70 mol. %, at least 80 mol. %, at least 90 mol. %, at least 95 mol. %, at least 99 mol. % of recurring units ($R_{P0}$) and ($R^*_{P0}$), based on the total number of moles in the copolymer (P0). The copolymer (P0) may preferably consists essentially in recurring units ($R_{P0}$) and ($R^*_{P0}$).

According to an embodiment, the copolymer (P0) of the present invention has a Tg ranging from 120 and 250° C., preferably from 170 and 240° C., more preferably from 180 and 230° C., as measured by differential scanning calorimetry (DSC) according to ASTM D3418.

In some embodiments, the compound $R_2$—SH used to react the copolymer (P0) is such that $R_2$ in recurring units ($R^*_{P1}$) is —$(CH_2)_3$—$Si(OCH_3)_3$.

In some embodiments, the reaction to prepare copolymer (P1) may be carried out in the presence of a base, for example selected from the group consisting of potassium carbonate ($K_2CO_3$), potassium tert-butoxide, sodium hydroxide (NaOH), potassium hydroxide (KOH), sodium carbonate ($Na_2CO_3$), cesium carbonate ($Cs_2CO_3$) and sodium tert-butoxide. The base may also be selected from the group consisting of N-Ethyl-N-(propan-2-yl)propan-2-amine (Hunig base), triethylamine (TEA) and pyridine.

In some embodiments, the reaction to prepare copolymer (P1) may be carried out in the presence of:
- at least one free radical initiator, preferably 2,2'-Azobis (2-methylpropionitrile) (AIBN), and/or
- at least one catalyst, preferably selected from peroxides and hydroperoxides.

According to an embodiment, the amount of copolymer (P1) at the end of the reaction is at least 10 wt. % based on the total weight of the copolymer (P0) and the solvent, for example at least 15 wt. %, at least 20 wt. % or at least 30 wt. %.

At the end of the reaction, the copolymer (P1) is separated from the other components (salts, base, . . . ) to obtain a solution. Filtration can for example be used to separate the copolymer (P1) from the other components. The solution can then be used as such for reacting the copolymer (P1) with other compounds, or alternatively, the copolymer (P1) can be recovered from the solvent, for example by coagulation or devolatilization of the solvent.

Process for Preparing Copolymer (P0)

In some embodiments, the allyl/vinylene-functionalized copolymer (P0) used in the process of the present invention has been prepared by condensation of at least one aromatic dihydroxy monomer (a1), with at least one aromatic sulfone monomer (a2) comprising at least two halogen substituents and at least one allyl-substituted aromatic dihydroxy monomer (a3).

The condensation to prepare copolymer (P0) is preferably carried out in a solvent. When the condensation to prepare copolymer (P0) is carried out in a solvent, the solvent is for example a polar aprotic solvent selected from the group consisting of N-methylpyrrolidone (NMP), N-butylpyrrolidone (NBP), N,N dimethylformamide (DMF), 1,3-dimethyl-2-imidazolidinone (DMI), N,N dimethylacetamide (DMAC), 1,3-dimethyl-2-imidazolidinone, tetrahydrofuran (THF), dimethyl sulfoxide (DMSO), chlorobenzene and sulfolane. The condensation to prepare copolymer (P0) is preferably carried out in sulfolane or NMP.

The condensation to prepare copolymer (P0) may be carried out in the presence of a base, for example selected from the group consisting of potassium carbonate ($K_2CO_3$), potassium tert-butoxide, sodium hydroxide (NaOH), potassium hydroxide (KOH), sodium carbonate ($Na_2CO_3$), cesium carbonate ($Cs_2CO_3$) and sodium tert-butoxide. The base acts to deprotonate the components (a1) and (a3) during the condensation reaction.

The molar ratio (a1)+(a3)/(a2) may be from 0.9 to 1.1, for example from 0.92 to 1.08 or from 0.95 to 1.05.

In some embodiments, the monomer (a2) is a 4,4-dihalosulfone comprising at least one of a 4,4'-dichlorodiphenyl sulfone (DCDPS) or 4,4' difluorodiphenyl sulfone (DFDPS), preferably DCDPS.

In some embodiments, the monomer (a1) comprises, based on the total weight of the monomer (a1), at least 50 wt. % of 4,4' dihydroxybiphenyl (biphenol), at least 50 wt. % of 2,2-bis(4-hydroxyphenyl)propane (bisphenol A) or at least 50 wt. % of 4, 4' dihydroxydiphenyl sulfone (bisphenol S).

In some embodiments, the monomer (a3) comprises, based on the total weight of the monomer (a1), at least 50 wt. % of 2,2'-diallylbisphenol A (daBPA).

According to the principles of condensation polymerization to prepare copolymer (P0), the monomers of the reaction mixture are generally reacted concurrently. The reaction is preferably conducted in one stage. This means that the deprotonation of monomers (a1) and (a3) and the condensation reaction between the monomers (a1)/(a3) and (a2) takes place in a single reaction stage without isolation of the intermediate products.

According to an embodiment, the condensation is carried out in a mixture of a polar aprotic solvent and a solvent which forms an azeotrope with water. The solvent which forms an azeotrope with water includes aromatic hydrocarbons such as benzene, toluene, xylene, ethylbenzene, chlorobenzene and the like. It is preferably toluene or chlorobenzene. The azeotrope forming solvent and polar aprotic solvent are used typically in a weight ratio of from about 1:10 to about 1:1, preferably from about 1:5 to about 1:1. Water is continuously removed from the reaction mass as an azeotrope with the azeotrope forming solvent so that substantially anhydrous conditions are maintained during the polymerization. The azeotrope-forming solvent, for example, chlorobenzene, is removed from the reaction mixture, typically by distillation, after the water formed in the reaction is removed leaving the copolymer (P0) dissolved in the polar aprotic solvent.

The temperature of the reaction mixture to prepare copolymer (P0) is kept at about 150° C. to about 350° C., preferably from about 210° C. to about 300° C. for about one to 15 hours.

The inorganic constituents, for example sodium chloride or potassium chloride or excess of base, can be removed, before or after isolation of the copolymer (P0), by suitable methods such as dissolving and filtering, screening or extracting.

According to an embodiment, the amount of copolymer (P0) at the end of the condensation is at least 30 wt. % based on the total weight of the copolymer (P0) and the polar aprotic solvent, for example at least 35 wt. % or at least or at least 37 wt. % or at least 40 wt. %.

At the end of the reaction, the copolymer (P0) is separated from the other components (salts, base, . . . ) to obtain a solution. Filtration can for example be used to separate the copolymer (P0) from the other components. The solution can then be used as such for reacting the copolymer (P0) with the compound $R_2$—SH in the process of the present invention, or alternatively, the copolymer (P0) can be recovered from the solvent, for example by coagulation or devolatilization of the solvent.

Applications

The adducts of the present invention may be used in the preparation of functional coatings. Chemical moieties on the surface of the coatings can be selected to make the coating hydrophobic, hydrophilic, bio-taggable, anti-microbial, anti-fouling and/or UV curable.

The copolymer (P1) of the present invention may also be used in the preparation of composite materials. In this application, the functionalities improve the adhesion of the resin to the reinforcing fibers thereby improving performance.

The present invention also relates to a method for coating a surface, comprising:
a) applying to the surface the copolymer (P1) of anyone of claims 1-10, optionally in combination with one or more solvents and/or additives,
b) heating the surface at a temperature ranging from 60° C. to 250° C., preferably from 65° C. to 200° C., and/or exposing the surface to humidity with a humidity percentage of a least 30%.

The present invention also relates to the use of the copolymer (P1) described herein in the preparation of an adduct to be used as a coating.

The present invention also relates to the use of the copolymer (P1) described herein in a sizing formulation comprising a resin, to improve the compatibility between the resin and the sized fibers, by heating the sized fibers and/or exposing the sized fibers to humidity with a humidity percentage of a least 30%.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Raw Materials
 DCDPS (4,4'-dichlorodiphenyl sulfone), available from Solvay Speciality Polymers
 BPA (bisphenol A), available from Covestro, U.S.A.
 BP (biphenol), polymer grade available from Honshu Chemicals, Japan
 DHDPS (4,4'-dihydroxydiphenyl sulfone), available from Honshu Chemicals, Japan
 daBPA (2,2'-diallyl Bisphenol), available from Sigma-Aldrich, U.S.A.
 $K_2CO_3$ (Potassium Carbonate), available from Armand products
 $NaHCO_3$ (Sodium bicarbonate), available from Solvay S. A., France
 NMP (2-methyl pyrrolidone), available from Sigma-Aldrich, U.S.A.
 MCB (monochlorobenzene), available from Sigma-Aldrich, U.S.A.
 DMSO (dimethylsulfoxide), available from Sigma-Aldrich, U.S.A.
 DCM (dichloromethane), available from Sigma-Aldrich, U.S.A.
 Sulfolane, available from Chevron Phillips Chemicals
 AIBN (Azobisisobutyronitrile), available from Sigma-Aldrich, U.S.A.
 Thiopropyl trimethoxysilane (HS—$(CH_2)_3Si(OCH_3)_3$)), available from Sigma-Aldrich, U.S.A Test Methods GPC—Molecular Weight (Mn, Mw)

The molecular weights were measured by gel permeation chromatography (GPC), using methylene chloride as a mobile phase. Two 5p mixed D columns with guard column from Agilent Technologies were used for separation. An ultraviolet detector of 254 nm was used to obtain the chromatogram. A flow rate of 1.5 ml/min and injection volume of 20 µL of a 0.2 w/v % solution in mobile phase was selected. Calibration was performed with 12 narrow molecular weight polystyrene standards (Peak molecular weight range: 371,000 to 580 g/mol). The number average molecular weight Mn, weight average molecular weight Mw, higher average molecular weight Mz, were reported.

Thermal Gravimetric Analysis (TGA)

TGA experiments were carried out using a TA Instrument TGA Q500. TGA measurements were obtained by heating the sample at a heating rate of 10° C./min from 20° C. to 800° C. under nitrogen.

$^1$H NMR $^1$H NMR spectra were measured using a 400 MHz Bruker spectrometer with TCE or DMSO as the deuterated solvent. All spectra are reference to residual proton in the solvent.

DSC

DSC was used to determine glass transition temperatures (Tg) and melting points (Tm)—if present. DSC experiments were carried out using a TA Instrument Q100. DSC curves were recorded by heating, cooling, re-heating, and then re-cooling the sample between 25° C. and 320° C. at a heating and cooling rate of 20° C./min. All DSC measurements were taken under a nitrogen purge. The reported Tg and Tm values were provided using the second heat curve unless otherwise noted.

I. Preparation of Allyl/Vinylene-Modified PSU Copolymer (P0-A)

The functionalized PPSU polymer (P0-A) was prepared according to the Scheme 1.

The copolymerization takes place in a glass reactor vessel (1 L) fitted with an overhead stirrer, nitrogen inlet and an overhead distillation set-up. The DCDPS monomer (143.58 g), BPA (102.73 g) and daBPA (15.42 g) are added to the vessel first, followed by the addition of $K_2CO_3$ (78.29 g), NMP (690 g) and MCB (170 g) as the azeotropic distillation solvent.

The reaction mixture is heated from room temperature to 190° C. using a 1° C./min heating ramp. The temperature of the reaction mixture is maintained for six to eight hours, depending upon the viscosity of the solution. The reaction is terminated by stopping the heating. The reaction mixture is filtered, coagulated into methanol and dried at 110° C.

The copolymer (P0-A) is in the form of a racemate product. Due to the presence of the base and high temperature during polymerization, the daBPA monomer racemizes during polymerization in such a way that the position of the double bond changes along the side chains. This leads to the formation of molecules differing from each other by the fact that the double bond may be at the end of the side chain or one carbon before the end of the side chain, as shown above.

Characterization of the Allyl/Vinylene-Modified PSU Copolymer (P0-A)
- GPC: Mn=10,948 g/mol, Mw=37,123 g/mol, PDI=3.39
- TGA: 474° C.
- DSC: 175° C.
- $^1$H NMR: The presence of unsaturated groups was confirmed by the appearance of a multiplet at 6.1-6.4 ppm which indicates the incorporation of the 2,2'-diallyl BPA monomer in the polymer.

II. Preparation of Allyl/Vinylene-Modified PPSU Copolymer (P0-B)

The functionalized PPSU polymer (P0-B) was prepared according to the Scheme 2.

The copolymerization takes place in a kettle type reactor vessel (1 L) fitted with an overhead stirrer, nitrogen inlet, a thermocouple and a dean stark trap. The DCDPS monomer (143.58 g), BPA (88.45 g) and daBPA (7.71 g) are added to the vessel first, and purged with nitrogen for 30 minutes. The sulfolane (470 g) is then added to the vessel, as well as the potassium carbonate (78 g).

The reaction mixture is then heated to 210° C. When the reaction mixture reaches this temperature, the reaction is maintained for 6 to 8 hours. After this time the heating is stopped and the reaction mixture is allowed to cool to room temperature and. The reaction mixture is filtered, coagulated into methanol and washed with hot deionized water.

The copolymer (P0-B) is in the form of a racemate product.

Characterization of the Allyl/Vinylene-Modified PPSU Copolymer (P0-B)
- GPC: Mn=26430 g/mol, Mw=126547 g/mol, PDI=4.78
- TGA: 493° C.
- DSC: 199° C.
- $^1$H NMR:
  The presence of unsaturated groups was confirmed by the appearance of a multiplet at 6.2-6.4 ppm which indicates the incorporation of the 2,2'-diallyl BPA monomer in the polymer.

III. Preparation of Allyl/Vinylene-Modified PES Copolymer (P0-C)

The functionalized PES polymer (P0-C) was prepared according to the Scheme 3.

The copolymerization takes place in a kettle type reactor vessel (1 L) fitted with an overhead stirrer, nitrogen inlet, a thermocouple and a dean stark trap. The monomers DCDPS (146.45 g), DHDPS (112.37 g) and 2,2'-daBPA (15.72 g) are added to the vessel first, and purged with nitrogen for 30 minutes. The NMP (283 g) is then added to the vessel, as well as $K_2CO_3$ (69.8 g).

The reaction mixture is then heated to 190° C. When the reaction mixture reaches this temperature, the reaction is maintained for 6 to 8 hours. After this time the heating is stopped and the reaction mixture is allowed to cool to room temperature and. The reaction mixture is filtered, coagulated into methanol and washed with hot deionized water.

The copolymer (P0-C) is in the form of a racemate product.

Characterization of the Allyl/Vinylene-Modified PES Copolymer (P0-C)
- GPC: Mw=29,997 g/mol, Mn=12,042 g/mol, PDI=2.49
- TGA: 415° C.
- DSC: Tg=214° C.
- $^1$H NMR: The presence of unsaturated groups was confirmed by the appearance of a multiplet at 6.1-6.4 ppm which indicates the incorporation of the 2,2'-diallyl BPA monomer in the polymer.

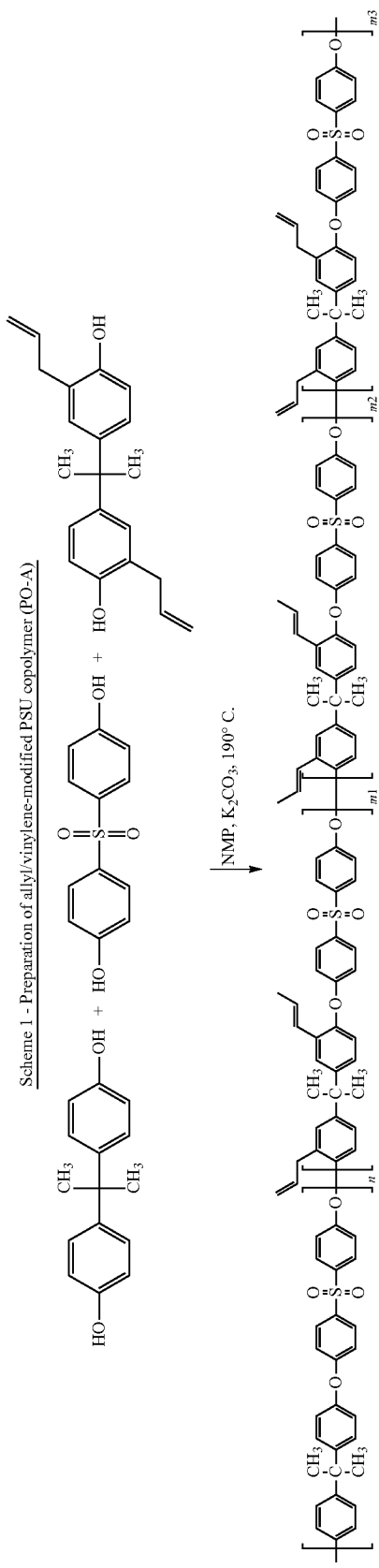

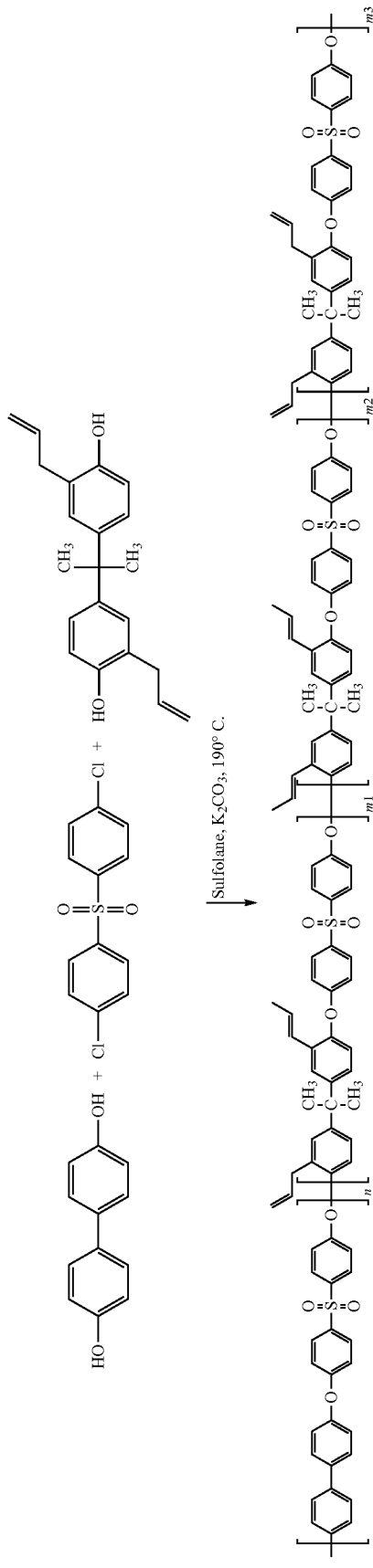

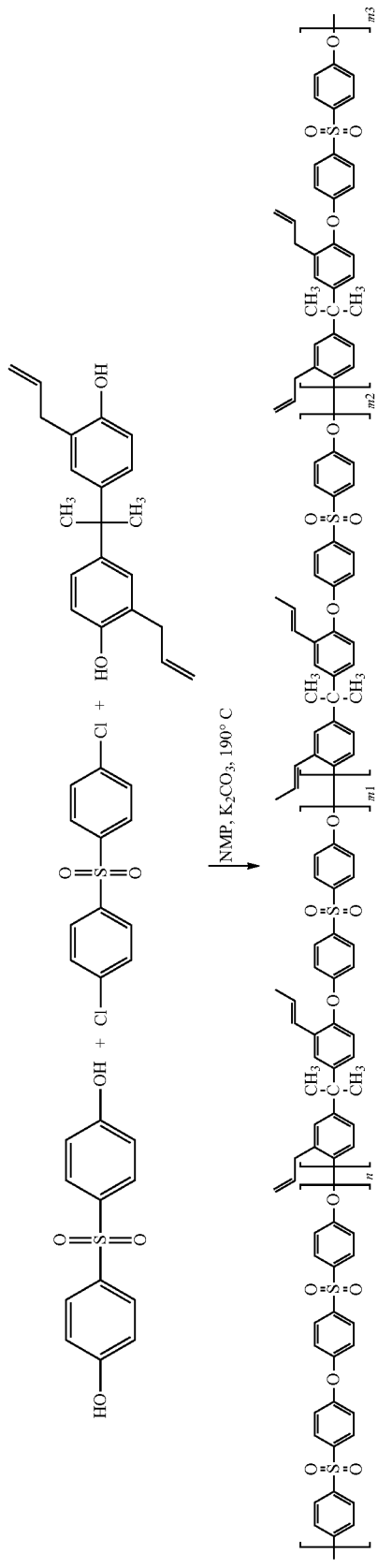
Scheme 2 - Preparation of allyl/vinylene-modified PES copolymer (PO-C)

Iv. Preparation of Functionalized PSU Copolymer (P1-a) by Free Radical Reaction

The functionalized PSU polymer (P1-A) was prepared according to the following procedure according to Scheme 4.

12.44 g of allyl/vinylene-modified copolymer (P0-A) prepared according to I. above (Scheme 1) is dissolved in 49.76 g of NMP at a temperature between 60 and 70° C. 19.8 g, 3-(trimethoxysilyl)propanethiol is then added to the reaction vessel and stirred. 1.64 g of AIBN (free radical initiator) is then added to the reaction vessel and stirred under $N_2$ for 6 to 12 hours. The temperature is maintained at 70° C. for 6 to 12 hours. The reaction mixture is then coagulated in methanol and dried at 110° C.

12.44 g of silanol functionalized polymer was obtained.

Characterization

DSC: Tg=152.2° C.

V. Preparation of Polymer Adduct by Heating

The adduct of functionalized PSU polymer (P1-A) was prepared according to Scheme 5.

The copolymer (P1-A) was heated in boiling water for 3 hours and the crosslinked material was then dried.

Characterization

The resultant material was completely insoluble in hot NMP.

The increase in the Tg after crosslinking seen by DSC: from 152.2° C. to 193.3° C.

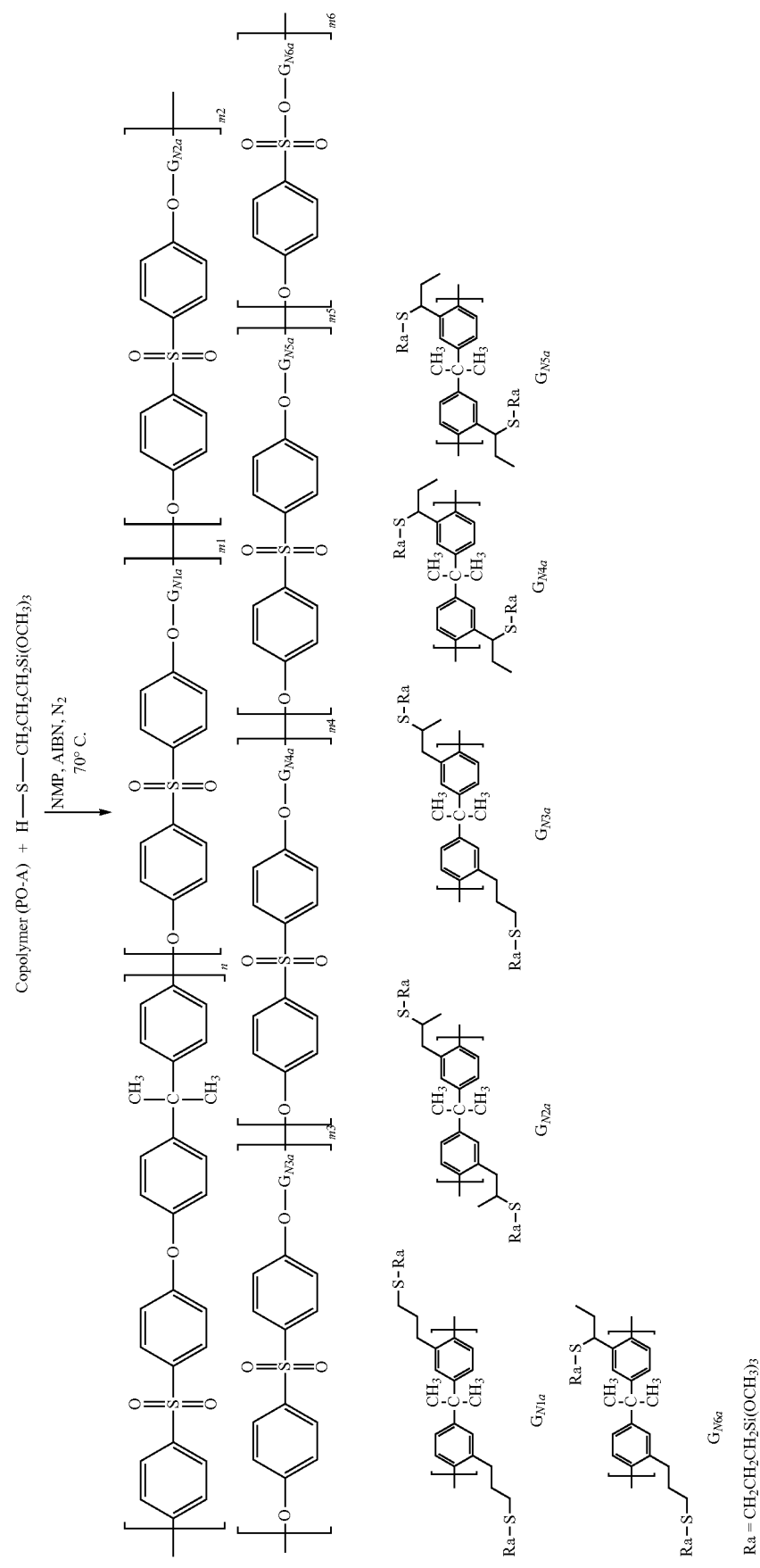

Scheme 5. Preparation of an adduct of functionalized PSU copolymer (P1-A)

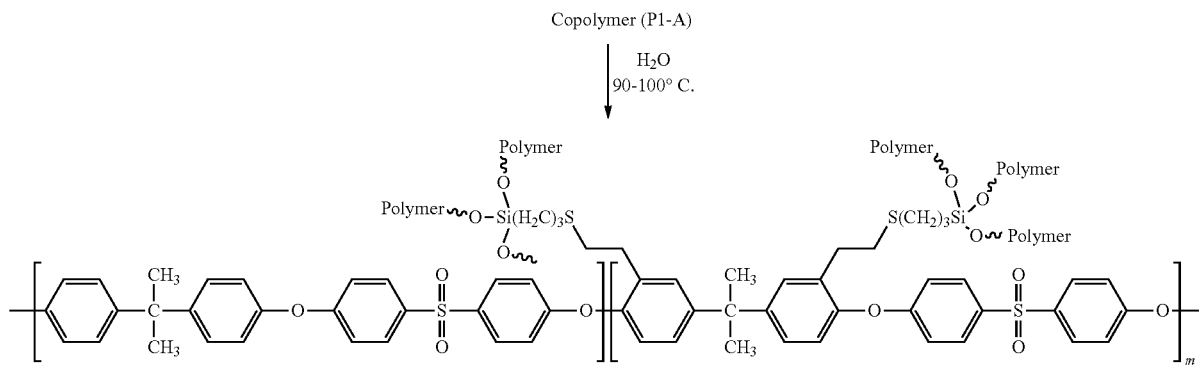

Nb: the crosslinking points can be composed of a covalent bond between any two silanol groups composed from $G_{N1a}$ to $G_{N6a}$

The invention claimed is:

1. A polymer adduct obtained by crosslinking a copolymer (P1) comprising:

recurring units ($R_{P1}$) of formula (M):

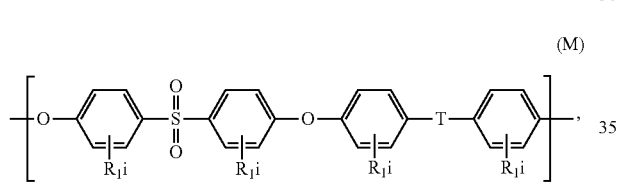

recurring units ($R^*_{P1}$) of formula (N):

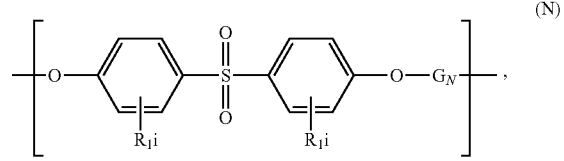

wherein
$G_N$ is selected from the group consisting of at least one of the following formulas:

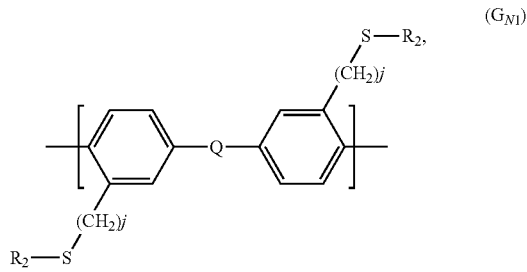

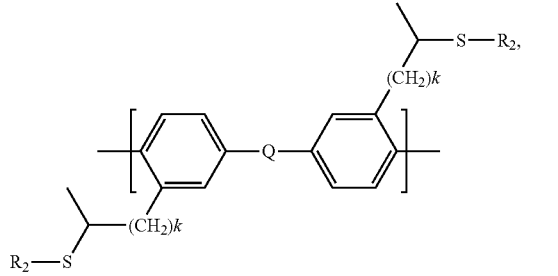

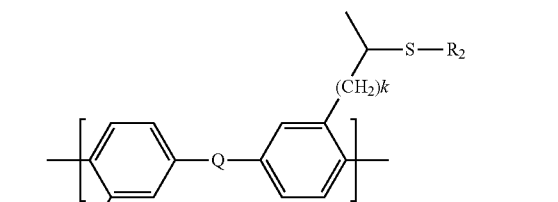

and

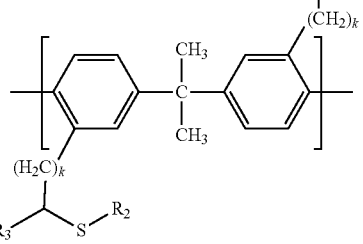

each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

$R_2$ is —$(CH_2)r$-$Si(OCH_3)_3$, with r being selected from 1 to 5;

$R_3$ is an alkyl group, an aryl group or an halogen group;

each k is independently selected from 0 to 4;

each j is independently selected from 3 to 7; and

T and Q are independently selected from the group consisting of a bond, —O—; —$SO_2$—; —S—; —C(O)—; —$C(CH_3)_2$—; —$C(CF_3)_2$—; —C(=$CCl_2$)—; —$C(CH_3)(CH_2CH_2COOH)$—; —N=N—; —$R_aC$=$CR_b$—, where each $R_a$ and $R_b$, independently of one another, is a hydrogen or a C1-C12-alkyl, C1-C12-alkoxy, or C6-C18-aryl group; —$(CH_2)_m$— and —$(CF_2)_m$— with m being an integer from 1 to 6; an aliphatic divalent group, linear or branched, of up to 6 carbon atoms; and combinations thereof.

2. The polymer adduct of claim 1, wherein T in the recurring units ($R_{P1}$) is selected from the group consisting of a bond, —$SO_2$— and —$C(CH_3)_2$—.

3. The polymer adduct of claim 1, wherein Q in the formulas ($G_{N1}$), ($G_{N2}$) and/or ($G_{N3}$) of the recurring units ($R^*_{P1}$) is selected from the group consisting of a bond, —$SO_2$— and —$C(CH_3)=_2$—.

4. The polymer adduct of claim 1, wherein i is zero for each $R_1$ of the recurring units ($R_{P1}$) and the recurring units ($R^*_{P1}$) of the copolymer (P1).

5. The polymer adduct of claim 1, wherein k is 0 and j is 3 in the recurring units ($R^*_{P1}$).

6. The polymer adduct of claim 1, wherein the molar ratio of the recurring units ($R_{P1}$)/recurring units ($R^*_{P1}$) varies between 0.01/100 and 100/0.01.

7. The polymer adduct of claim 1, wherein the recurring units ($R_{P1}$) are according to formula (M1):

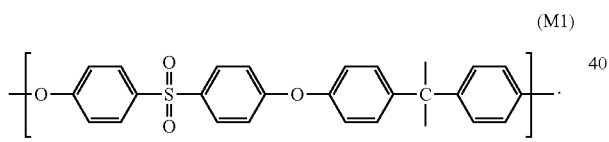

(M1)

8. The polymer adduct of claim 1, wherein $R_2$ in the recurring units ($R^*_{P1}$) of the copolymer (P1) is —$(CH_2)_3$—$Si(OCH_3)_3$.

9. The polymer adduct of claim 1, comprising collectively at least 50 mol. % of the recurring units ($R_{P1}$) and ($R^*_{P1}$), based on the total number of moles in the copolymer (P1).

10. The polymer adduct of claim 1, wherein crosslinking of the copolymer (P1) is obtained by at least one of the following:
heating at a temperature ranging from 60° C. to 250° C.,
exposing to acid/basic conditions, respectively to a pH <5 or a pH >9, and/or
exposing to humidity with a humidity percentage of a least 30%.

11. A method for coating a surface, comprising:
a) applying to the surface a copolymer (P1), optionally in combination with one or more solvents and/or additives, and
b) heating the surface at a temperature ranging from 60° C. to 250° C., and/or exposing the surface to humidity with a humidity percentage of a least 30%, wherein the copolymer (P1) comprises:
recurring units ($R_{P1}$) of formula (M):

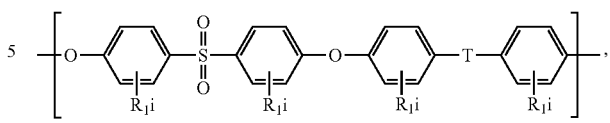

(M)

recurring units ($R^*_{P1}$) of formula (N):

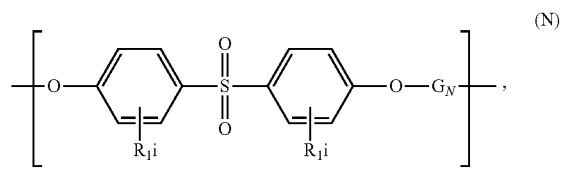

(N)

wherein $G_N$ is selected from the group consisting of at least one of the following formulas:

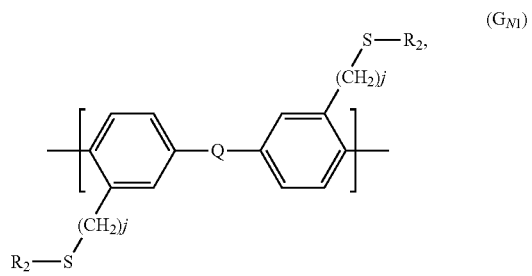

($G_{N1}$)

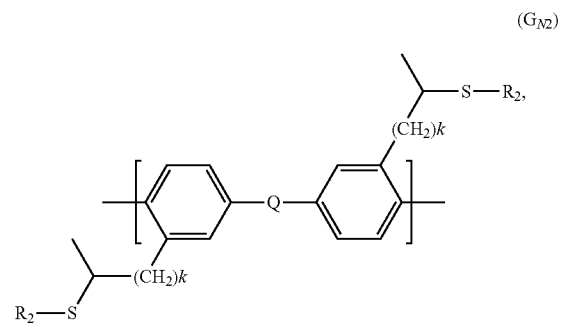

($G_{N2}$)

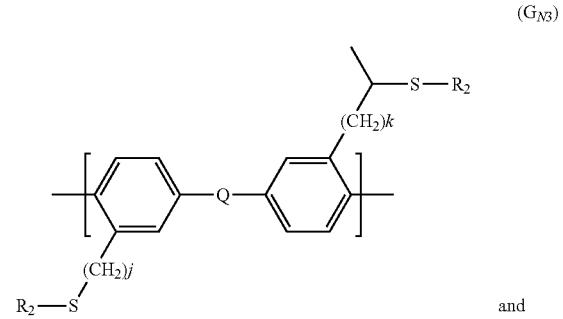

($G_{N3}$)

and

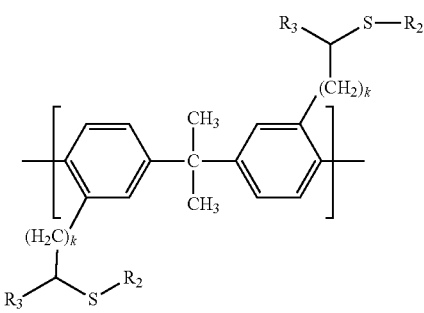

each R₁ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

R₂ is —(CH₂)r-Si(OCH₃)₃, with r being selected from 1 to 5;

R₃ is an alkyl group, an aryl group or an halogen group;

each k is independently selected from 0 to 4;

each j is independently selected from 3 to 7; and

T and Q are independently selected from the group consisting of a bond, —O—; —SO₂—; —S—; —C(O)—; —C(CH₃)₂—; —C(CF₃)₂—; —C(=CCl₂)—; —C(CH₃)(CH₂CH₂COOH)—; —N=N—; —R_aC—CR_b—, where each R_a and R_b, independently of one another, is a hydrogen or a C1-C12-alkyl, C1-C12-alkoxy, or C6-C18-aryl group; —(CH₂)_m— and —(CF₂)_m— with m being an integer from 1 to 6; an aliphatic divalent group, linear or branched, of up to 6 carbon atoms; and combinations thereof.

12. A method for preparing the adduct of claim 1, said adduct being used as a coating, as an additive in a composite material to improve binding between a filler and a polymeric matrix or as a self-crosslinkable resin to prepare composite products, said method comprising crosslinking the copolymer (P1).

13. A method for improving compatibility between a resin and sized fibers, comprising using a polymer (P1) in a sizing formulation comprising the resin and the sized fibers and heating the sized fibers and/or exposing the sized fibers to humidity with a humidity percentage of a least 30%, wherein the copolymer (P1) comprises:

recurring units (R_{P1}) of formula (M):

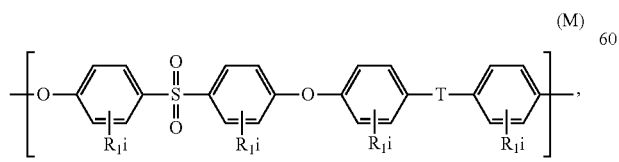

recurring units (R*_{P1}) of formula (N):

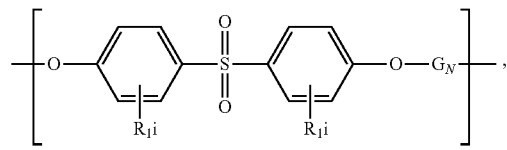

wherein

G_N is selected from the group consisting of at least one of the following formulas:

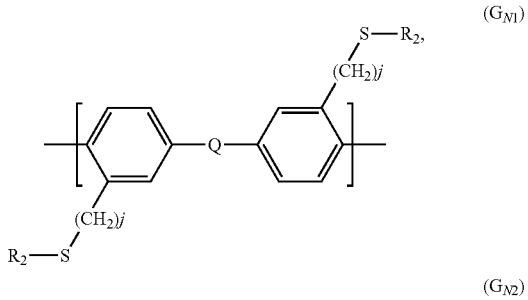

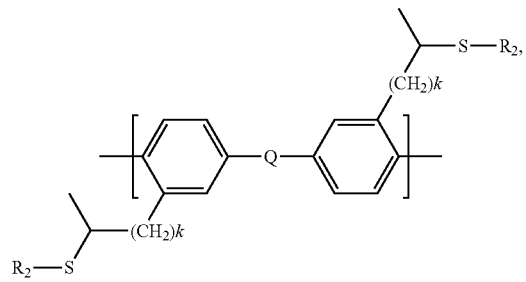

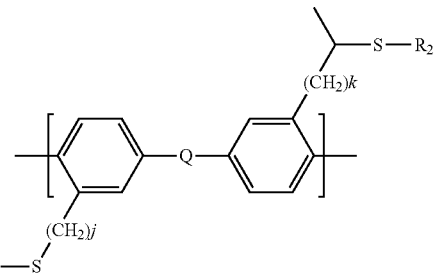

and

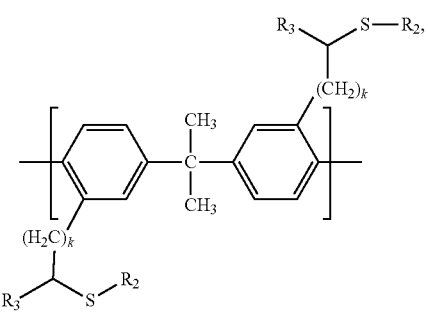

each R₁ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

$R_2$ is —$(CH_2)$r-$Si(OCH_3)_3$, with r being selected from 1 to 5;

$R_3$ is an alkyl group, an aryl group or an halogen group;

each k is independently selected from 0 to 4;

each j is independently selected from 3 to 7; and

T and Q are independently selected from the group consisting of a bond, —O—; —$SO_2$—; —S—; —C(O)—; —$C(CH_3)_2$—; —$C(CF_3)_2$—; —C(=$CCl_2$)—; —$C(CH_3)(CH_2CH_2COOH)$—; —N=N—; —$R_aC$=$CR_b$—, where each $R_a$ and $R_b$, independently of one another, is a hydrogen or a C1-C12-alkyl, C1-C12-alkoxy, or C6-C18-aryl group; —$(CH_2)_m$— and —$(CF_2)_m$— with m being an integer from 1 to 6; an aliphatic divalent group, linear or branched, of up to 6 carbon atoms; and combinations thereof.

14. The method of claim 13, comprising reacting the copolymer (P1) with a sizing agent located at the surface of the sized fibers.

15. The method for preparing the adduct of claim 12, wherein the crosslinking of the copolymer (P1) is obtained by at least one of the following:
heating at a temperature ranging from 60° C. to 250° C.,
exposing to acid/basic conditions, respectively to a pH <5 or a pH >9, and/or
exposing to humidity with a humidity percentage of at least 30%.

16. The polymer adduct of claim 1, being used as a coating, as an additive in a composite material to improve binding between filler and a polymeric matrix, or as a self-crosslinkable resin to prepare composite products.

17. The polymer adduct of claim 1, wherein the molar ratio of the recurring units $(R_{P1})$/recurring units $(R^*_{P1})$ varies between 1/1 and 12/1.

* * * * *